United States Patent [19]

Varshney et al.

[11] Patent Number: 5,294,674
[45] Date of Patent: Mar. 15, 1994

[54] HEAT-RESISTANT MALEIMIDO POLYMERS/BLOCK COPOLYMERS

[75] Inventors: Sunil K. Varshney, Liege; Philippe Teyssie, Neuville en Condroz; Roger Fayt, Neupre, all of Belgium

[73] Assignee: Atochem, Puteaux, France

[21] Appl. No.: 804,674

[22] Filed: Dec. 10, 1991

Related U.S. Application Data

[63] Continuation of Ser. No. 618,637, Nov. 27, 1990, abandoned.

[30] Foreign Application Priority Data

Nov. 27, 1989 [FR] France .................................. 89 15581

[51] Int. Cl.⁵ .................... C08F 267/10; C08F 271/02
[52] U.S. Cl. ...................................... 525/282; 525/309
[58] Field of Search ...................... 525/282, 250, 309

[56] References Cited

U.S. PATENT DOCUMENTS 5,164,451 11/1992 Kato et al. ............................ 525/282

FOREIGN PATENT DOCUMENTS 230612 11/1988 Japan .................................... 525/282

OTHER PUBLICATIONS

T. Hagiwara et al; J. Polymer Science, Polymer Chem. Ed., 26 1011-1020 (1988).

R. Cubbon 6 419 (1965).
Chemical Abstracts, vol. 77, 1972, p. 11, Abstract No. 20159b.
Kobunshi Kagaku, vol. 29, No. 323, pp. 144-148 (Mar. 1972). "Anionic Polymerization of N-Phenylmaleimide and Its N-4-Substituted Derivatives" by M. Yamada, I. Takase and M. Kobayashi.

*Primary Examiner*—Joseph L. Schofer
*Assistant Examiner*—Wu C. Cheng
*Attorney, Agent, or Firm*—Burns, Doane, Swecker & Mathis

[57] ABSTRACT

Novel N-substituted maleimide homopolymers having a number-average molecular weight ranging from 12,000 to about 100,000 are prepared by anionically polymerizing an N-substituted maleimide monomer, in solvent phase, in the presence of at least one organometallic polymerization initiator which comprises sec-butyllithium, a sodium alcoholate, diphenylmethylpotassium, naphthalenelithium or naphthalenesodium, and novel N-substituted maleimide homopolymers having a polydispersity index ranging from 1.1 to 1.5 are prepared by anionically polymerizing an N-substituted maleimide monomer, in solvent phase, in the presence of at least one alkali metal organometallic polymerization initiator and at least one inorganic or organic salt of an alkali or alkaline earth metal; novel block copolymers include blocks of the above maleimido homopolymers and, e.g., blocks of an acrylic or methacrylic polymer.

15 Claims, No Drawings

HEAT-RESISTANT MALEIMIDO POLYMERS/BLOCK COPOLYMERS

This application is a continuation of application Ser. No. 07/618,637, filed Nov. 27, 1990 now abandoned.

BACKGROUND OF THE INVENTION

1. Field of the Invention

The present invention relates to novel polymers having improved resistance to heat, and, more especially, to novel polymers comprising maleimido recurring structural units.

2. Description of the Prior Art

The polymerization of N-substituted maleimides by free radical and anionic routes is known to this art. Thus, R, Cubbon, *Polymer*, 6, 419 (1965) has reported that polymers having a predominantly threodiisotactic configuration are obtained by polymerizing N-ethylmaleimide using n-butyllithium as initiator:

(i) either in toluene, at temperatures not exceeding −20° C., for period of time ranging from 20 minutes to 3 hours, providing a yield not exceeding 22%; or (ii) in tetrahydrofuran, at −70° C., rapidly providing a yield ranging up to 95%.

With regard to N-phenylmaleimide, T. Hagiwara et al, *Makromol. Chem., Rapid Commun.*, 6, 169 (1985) has described the influence of the selection of the initiator and the reaction conditions on the anionic polymerization and has confirmed the observations of R. Cubbon and also shown that:

(i) yields in excess of 85% are obtained in tetrahydrofuran between −72° C. and 0° C. for reaction periods of 30 to 60 minutes in the presence of potassium tert-butanolate. The number-average molecular weight of the polymer obtained can be as high as 8,000 for a reaction period of 3 hours at −72° C.; and (ii) a quantitative yield in the presence of a large proportion of lithium tert-butanolate can be obtained at 0° C. in tetrahydrofuran, the resulting polymer having a number-average molecular weight of only 2,000.

As regards N-ethylmaleimide, the above observations have also been confirmed by T. Hagiwara et al, in *J. Polym. Sci., Polym. Chem. Ed.*, 26, 1011 (1988). However, in addition to the above confirmation, the authors present the possibility of excellent polymerization yields at +24° C. in the presence of potassium tert-butanolate, equally well in toluene as in tetrahydrofuran, the active nature of the reaction process also permitting a number-average molecular weight of up to 6,400 to be attained.

From the above prior art, it will be seen, in summary, that, on the one hand, the polymerization of N-substituted maleimides by an anionic route produces results which are highly differentiated depending on the nature, alkyl or aryl, of the N-substitution and, with a single exception, depending on the nature of the solvent used. On the other hand, to date no process has been proposed to the art enabling polymers of high molecular weight to be produced (the attainable degree of polymerization appearing to be limited to about 50). From the first observation, it will be appreciated that need exists in this art for polymers having a controlled, and preferably narrow molecular weight distribution, prepared by a process that proceeds under industrially safe conditions. From the second observation, it will be appreciated that polymers having too low a molecular weight have scant industrial applications.

SUMMARY OF THE INVENTION

Accordingly, a major object of the present invention is the provision of improved technique for synthesizing, in good yields, novel N-substituted maleimide polymers having a narrow molecular weight distribution, said novel polymers comprising recurring structural units derived from maleimides having intrinsic characteristics corresponding to the actual industrial applications intended therefor, and in particular polymers of high molecular weight.

Another object of the present invention is the provision of such novel polymers, i.e., polymers comprising blocks of high molecular weight based on N-substituted maleimide, using specific anionic polymerization initiators not heretofore employed in the polymerization of this type of monomer. Thus, a judicious selection of these initiators enables polymer blocks to be obtained having a molecular weight which is at least equal to 12,000, namely, half as high again as the highest molecular weight known to date, and can be up to about 100,000.

It has also now been determined that, whatever the anionic polymerization initiator used and, thus, whatever the molecular weight of the base N-substituted maleimide polymer, a narrow distribution of molecular weights can be attained by adding a compound selected from among the inorganic salts and the organic salts of alkali metals or alkaline earth metals to the polymerization initiator. The addition of such a compound generally enables the polydispersity of the polymer block based on N-substituted maleimide to be lowered to a value ranging from approximately 1.1 to 1.5, although, in the absence of such additive, the polydispersity is currently in excess of 1.7. As is well known to the art of anionic polymerization, such a difference in polydispersity most typically presents the advantage of favorably modifying the characteristics and properties of the products which can be produced from these polymers.

Finally, it has also now been found that polymer blocks based on N-substituted maleimide, if necessary of high molecular weight and/or of low dispersity as described above, can advantageously be combined with polymer blocks based on acrylic or methacrylic monomers, for example in the form of bi-block or tri-block copolymers.

Briefly, the present invention features a process for the anionic polymerization of an N-substituted maleimide in a solvent and in the presence of at least one alkali metal organometallic initiator, wherein the polymerization initiator used is a compound selected from among sec-butyllithium, sodium alcoholates, diphenylmethylpotassium, naphthalenelithium and naphthalenesodium.

As indicated above, the principal effect of the process according to the invention is provided by the increase in the molecular weight of the resulting polymer. Indeed, the process according to the invention permits the preparation of polymer blocks, based on N-substituted maleimide, having a molecular weight which is at least equal to 12,000 and which can range up to about 100,000, even though known anionic polymerization initiators, such as either those already proposed to the art in respect of maleimides (n-butyllithium, potassium tert-butanolate, lithium tert-butanolate) or others such as cumylpotassium, tert-butyl-lithium or alpha-methylstyryllithium, have been shown to be incapable of preparing N-substituted polymaleimides having a molecular weight in excess of 8,000.

DETAILED DESCRIPTION OF THE PREFERRED EMBODIMENTS OF THE INVENTION

More particularly according to the present invention, by "N-substituted maleimide" is intended a monomer of the formula:

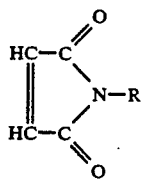

in which R is an alkyl, arylalkyl, aryl or alkylaryl radical having from 1 to 12 carbon atoms. Exemplary such monomers include, in particular, N-ethylmaleimide, N-isopropylmaleimide, N-n-butylmaleimide, N-isobutylmaleimide, N-tertbutylmaleimide, N-n-octylmaleimide, N-cyclohexylmaleimide, N-benzylmaleimide and N-phenylmaleimide.

In the process according to this invention, the solvent is preferably selected from among aromatic solvents, such as benzene and toluene, or tetrahydrofuran, diglyme, tetraglyme, orthoterphenyl, biphenyl, decalin, tetralin or dimethylformamide or mixtures thereof, and the temperature preferably ranges from approximately $-78°$ C. to $+20°$ C.

The present invention also features a process for the preparation of polymers, based on N-substituted maleimide, having a narrow molecular weight distribution, by anionic polymerization of said maleimide in a solvent and in the presence of an initiator system comprising at least one alkali metal organometallic initiator and at least one compound selected from among the inorganic salts and the organic salts of alkali metals or alkaline earth metals. Exemplary such organometallic initiators include, in addition to those indicated above, compounds such as diphenylmethyllithium, diphenylmethylsodium, 1,4-dilithio-1,1,4,4-tetraphenylbutane and 1,4-disodio-1,1,4,4-tetraphenylbutane.

The compound combined with the organometallic initiator is selected from, on the one hand, inorganic salts of alkali metals or alkaline earth metals, for example the chlorides, fluorides, bromides, iodides, borides, sulfates, nitrates and borates, and, on the other, the organic salts of alkali metals, for example the alcoholates, the esters of carboxylic acids substituted in the alpha-position by said metal and the compounds in which the said alkali metal is associated with a group such as:

(A) those of the formula:

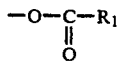     (II)

in which $R_1$ is a straight or branched chain alkyl radical having from 1 to 20 carbon atoms, a cycloalkyl radical having from 3 to 20 carbon atoms, or an aryl radical having from 6 to 14 carbon atoms;

(B) those of the formula:

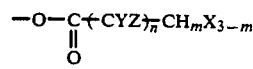     (III)

in which Y and Z, which may be identical or different, are each a hydrogen atom or a halogen atom, n is an integer ranging from 0 to 4, X is a halogen atom, and m is an integer ranging from 0 to 2;

(C) those of the formula:

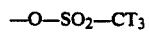     (IV)

in which T is a hydrogen atom or a halogen atom; and (D) those of the formula:

     (V)

in which $R_2$ is a hydrogen atom or an alkyl or aryl radical.

Exemplary of the groups of formula (II) are the acetate, propionate and benzoate groups.

Exemplary of the groups of formula (III) are the alpha-bromoacetate and trifluoroacetate groups.

Exemplary of the groups of formula (IV) are the trifluoromethanesulfonic and methanesulfonic groups.

Exemplary of the groups (V) are the borohydride and tetraphenylboride groups.

In this "second" process according to the invention, the solvent is preferably selected from among the aromatic solvents, such as benzene and toluene, or tetrahydrofuran, diglyme, tetraglyme, ortho-terphenyl, biphenyl, decalin, tetralin or dimethylformamide or mixtures thereof, and the temperature preferably ranges from approximately $-78°$ C. to $+20°$ C. Of course, when the polymerization initiator is selected from among sec-butyllithium, sodium alcoholates, diphenylmethylpotassium, naphthalenesodium and naphthalenelithium, the characteristic features of above two processes can be combined, which permits polymers based on an N-substituted maleimide to be produced which have, at one and the same time, a high number-average molecular weight and a narrow molecular weight distribution.

The present invention also features a multi-block copolymer in which at least one polymer block based on an N-substituted maleimide is combined with at least one polymer block based on an acrylic or methacrylic monomer, with the exception of tri-block copolymers having a number-average molecular weight ranging from 3,000 to 300,000 and a polydispersity of the molecular weights ranging from 1.05 to 2.0, and having at least one end block based on an N-substituted maleimide.

By "acrylic monomer" is intended a monomer selected from among primary, secondary or tertiary alkyl acrylates, in which the alkyl group, which may be substituted, for example by at least one halogen atom, such as chlorine or fluorine, and/or at least one hydroxyl group, has from 1 to 18 carbon atoms. Exemplary such acrylic monomers include, in particular, ethyl acrylate, propyl acrylate, isopropyl acrylate, butyl acrylate, isobutyl acrylate, hexyl acrylate, tert-butyl acrylate, 2-ethylhexyl acrylate, nonyl acrylate, lauryl acrylate, stearyl acrylate, cyclohexyl acrylate, isodecyl acrylate and also phenyl acrylate, isobornyl acrylate, the alkylthioalkyl or alkoxyalkyl acrylates, acrylonitrile and dialkylacrylamides.

By "methacrylic monomer" is intended a monomer selected from among alkyl methacrylates, in which the alkyl radical, which may be substituted, for example by at least one halogen atom, such as chlorine or fluorine, and/or at least one hydroxyl group, has from 1 to 18 carbon atoms. Exemplary such methacrylic monomers include methyl, ethyl 2,2,2-trifluoroethyl, n-propyl, isopropyl, n-butyl, sec-butyl, tert-butyl, n-amyl, i-amyl, hexyl, 2-ethylhexyl, cyclohexyl, octyl, i-octyl, decyl, beta-hydroxyethyl, hydroxypropyl and hydroxybutyl methacrylates and also glycidyl methacrylate, norbornyl methacrylate, methacrylonitrile and dialkylmethacrylamides.

The multi-block copolymers according to the invention can be, in particular, bi-block copolymers in which a block based on N-substituted maleimide is bonded to a block based on an acrylic or methacrylic monomer. They can also be tri-block copolymers in which a central block based on an N-substituted maleimide is bonded to two end blocks based on an acrylic or methacrylic monomer. It will of course be appreciated that, if the block based on an N-substituted maleimide has been prepared by the first process of the present invention, the resulting multi-block copolymer will comprise a block having recurring structural units derived from said maleimide and having a high molecular weight, for example at least equal to 12,000 and even ranging up to approximately 100,000. Similarly, if the block based on an N-substituted maleimide has been prepared by the second process of the present invention, the resulting multi-block copolymer will comprise a block having recurring structural units derived from said maleimide and having a low polydispersity of molecular weights, for example a polydispersity ranging from approximately 1.1 to 1.5.

In the multi-block copolymers according to the invention, the average molecular weight of the block based on the acrylic or methacrylic monomer can vary over wide limits, ranging, in particular, from approximately 2,000 to 100,000. This block can itself have a low polydispersity of molecular weights, if it has been prepared in the presence of at least one compound selected from the inorganic salts and the organic salts of alkali metals or alkaline earth metals as described above.

In one embodiment of the present invention, the blocks constituting an acrylic and/or methacrylic monomer block, as described above, can be hydrolyzed to a corresponding acrylic acid and/or methacrylic acid block and such block can, if desired, subsequently be saponified into a corresponding alkali metal acrylate and/or methacrylate block.

In another embodiment of the present invention, the blocks constituting an acrylic and/or methacrylic monomer block, as described above, can be transesterified to another acrylic and/or methacrylic monomer block, for example to replace a tertiary or secondary acrylate by a primary acrylate.

The present invention also features a process for the production of a bi-block copolymer in which a polymer block based on an N-substituted maleimide is bonded to a polymer block based on an acrylic or methacrylic monomer, or of a tri-block copolymer in which the central block based on an N-substituted maleimide is bonded to two end blocks based on an acrylic or methacrylic monomer, and which comprises:

(1) conducting an anionic polymerization of at least one acrylic or methacrylic monomer using a monofunctional initiator and, if necessary, in the presence of at least one compound selected from among the inorganic salts and the organic salts of alkali metals or alkaline earth metals and the non-nitrogenous macrocyclic complexing agents, such as to produce a functional polymer block based on the acrylic or methacrylic monomer; and (2) next reacting such functional block thus produced with at least one N-substituted maleimide to obtain a functional bi-block copolymer capable of reacting, in turn, with at least one acrylic or methacrylic monomer to form a tri-block copolymer.

The monofunctional initiator which can be used in the above process can be a compound of the formula:

$$(R)_p-M \qquad (I)$$

in which M is an alkali metal or alkaline earth metal (valency p of 1 or 2); and R is a straight or branched chain alkyl radical having 2 to 6 carbon atoms, or an alkyl radical having 1 to 6 carbon atoms substituted by at least one phenyl group.

Exemplary such compounds include, in particular, sec-butyllithium, n-butyllithium and alpha-methylstyryllithium, 1,1-diphenylhexyllithium, diphenylmethyl-lithium or -sodium or -potassium and 1,1-diphenyl-3-methylphenyllithium. The monofunctional initiator can also be an alkali metal alcoholate.

The present invention also features a process for the preparation of a tri-block copolymer in which a central block based on an acrylic or methacrylic monomer is bonded to two end blocks based on an N-substituted maleimide, and which comprises:

(1) conducting an anionic polymerization of at least one acrylic or methacrylic monomer using a bifunctional initiator and, if desired, in the presence of at least one compound selected from among the inorganic salts and the organic salts of alkali metals or alkaline earth metals and non-nitrogenous macrocyclic complexing agents, as to produce a dianion of the polymer block based on the acrylic or methacrylic monomer; and (2) next reacting such dianion with at least one N-substituted maleimide.

Exemplary bifunctional initiators which can be used in this process are, in particular, 1,4-dilithio-1,1,4,4-tetraphenylbutane, 1,4-disodio-1,1,4,4-tetraphenylbutane, naphthalenesodium and naphthalenelithium.

As in the "second" process of the present invention, the amount of compound which may be present during the synthesis of the multi-block copolymers can vary greatly with respect to the initiator. This amount can be, for example, substantially in excess of the molar amount of initiator. This amount can also be less than or equal to the molar amount of initiator. Preferably, the ligand is introduced in a molar proportion with respect to the initiator ranging from approximately 0.3 up to 15.

In the process according to the invention, the polymerizations of steps (1) and (2) preferably are carried out in the absence of moisture and oxygen and in the presence of at least one solvent, preferably selected from among the aromatic solvents, such as benzene and toluene, or tetrahydrofuran, diglyme, tetraglyme, ortho-terphenyl, decalin, tetralin or dimethylformamide.

With respect to the polymerization or copolymerization temperature, this can range from about −78° C. to +20° C.

Moreover, the multi-block copolymers according to the invention can be hydrolyzed at a temperature ranging from approximately 70° to 170° C., under a pressure ranging from 1 to 15 bar and in the presence of approximately 0.5 to 10% by weight, relative to the copolymer, of an acid catalyst such as paratoluenesulfonic acid, methanetoluenesulfonic acid or hydrochloric acid, in a polar solvent, such as dioxane. After hydrolysis, the tri-block copolymers comprising acrylic and/or methacrylic acid blocks can be precipitated in heptane, filtered off, washed to remove any trace amounts of catalyst and finally dried. They can also subsequently be neutralized using a methanolic potassium hydroxide solution or tetramethylammonium hydroxide in solution in a mixture of toluene and methanol to form the corresponding tri-block ionomers.

When the tri-block copolymers according to the invention comprise a block derived from a tertiary or secondary alkyl acrylate, this block can also be transesterified in known manner to provide a primary alkyl acrylate block.

In order to further illustrate the present invention and the advantages thereof, the following specific examples are given, it being understood that same are intended only as illustrative and in nowise limitative.

In said examples to follow, the exclusion chromatography was carried out using a WATERS GPC 501 apparatus fitted with two linear columns, using tetrahydrofuran as eluent at a flow rate of 1 ml/min. The number-average molecular weights were determined using an HP 502 membrane osmometer.

EXAMPLE 1

100 ml of pre-dried tetrahydrofuran and, with stirring, $10^{-4}$ mol of sec-butyllithium were introduced into a pre-dried round-bottomed flask under a nitrogen atmosphere. The mixture was brought to a temperature of $-78°$ C. using a mixture of acetone and solid carbon dioxide and a solution of 2 g of N-cyclohexylmaleimide in toluene was then added. The solvents and the monomer were purified by the customary techniques for anionic polymerization; in particular, the N-cyclohexylmaleimide was treated successively with calcium hydride and triethylaluminum.

A poly(N-cyclohexylmaleimide) was thus obtained, in a yield of 100%, which had the following characteristics:

$\overline{M}n$ = number-average molecular weight (in thousands);
$\overline{M}w$ = weight-average molecular weight;
$\overline{M}w/\overline{M}n$ = polydispersity of the molecular weights;
Tg = glass transition temperature (in degrees Celsius).

The values of these properties are reported in the Table below.

EXAMPLE 2

The procedure of Example 1 was repeated, but replacing sec-butyllithium by diphenylmethylpotassium. The polymerization yield and the characteristics of the polymer obtained are reported in the table below.

EXAMPLE 3

The procedure of Example 1 was repeated, but replacing N-cyclohexylmaleimide by N-isopropylmaleimide. The polymerization yield and the characteristics of the polymer obtained are reported in the table below.

EXAMPLE 4

The procedure of Example 1 was repeated, but replacing sec-butyllithium by sodium tert-butanolate. The polymerization yield and the characteristics of the polymer obtained are reported in the table below.

TABLE

| Example | 1 | 2 | 3 | 4 |
|---|---|---|---|---|
| Yield | 100 | 100 | 100 | 85 |
| $\overline{M}n$ | 32 | 24 | 20 | 80 |
| $\overline{M}w/\overline{M}n$ | 2.1 | 2.3 | 2.0 | 1.7 |
| Tg | 280 | 284 | n.d. | 244 | n.d.: not determined.

EXAMPLE 5

Repeating the procedure of Example 1 and successively introducing tert-butyl acrylate and then N-cyclohexylmaleimide, the block copolymerization of these two monomers was carried out at $-78°$ C. (the durations of each step being, successively, 15 and 120 minutes) under the following conditions:

Alpha-methylstyryllithium:$0.43 \times 10^{-3}$ mol
Lithium chloride:$0.43 \times 10^{-2}$ mol
Tert-butyl acrylate:4.4 g
N-cyclohexylmaleimide:2.0 g
Tetrahydrofuran:50 ml.

A bi-block copolymer having the following characteristics:

$\overline{M}n$ (acrylate) = 10,600
$\overline{M}n$ (maleimide) = 3,900
$\overline{M}w/\overline{M}n$ (total copolymer) = 1.14
was obtained in a yield of 100%.

EXAMPLE 6

Repeating the procedure of Example 1 and successively introducing methyl methacrylate and then N-cyclohexylmaleimide, the block copolymerization of these two monomers was carried out at $-78°$ C. (the durations of each step being, successively, 15 minutes and 2 hours) under the following conditions:

Diphenylmethyllithium:$0.2 \times 10^{-3}$ mol
Methyl methacrylate:0.9 g
N-cyclohexylmaleimide:4 g
Tetrahydrofuran:100 ml.

A bi-block copolymer having the following characteristics:

$\overline{M}n$ (methacrylate) = 6,100
$\overline{M}n$ (maleimide) = 2,300
$\overline{M}w/\overline{M}n$ (total copolymer = 1.35
was obtained in a yield of 40%.

EXAMPLE 7

The procedure of Example 6 was repeated, but changing the proportions of the ingredients as follows:

Diphenylmethylsodium:$0.25 \times 10^{-3}$ mol
Methyl methacrylate:5 g
N-cyclohexylmaleimide:5 g
Lithium chloride:$0.25 \times 10^{-2}$ mol
Tetrahydrofuran:100 ml
$\overline{M}n$ (methacrylate):18,300
$\overline{M}n$ (maleimide):7,700
$\overline{M}w/\overline{M}n$ (total copolymer):1.10.

EXAMPLE 8 (COMPARATIVE)

1 g of N-cyclohexylmaleimide was polymerized in accordance with the procedure of Example 1, but replacing sec-butyllithium by $0.27 \times 10^{-3}$ mol of cumylpotassium. The polymer obtained under these conditions, in a yield of 98%, had a number-average molecular weight of 6,000 and a polydispersity of 1.8.

EXAMPLE 9 (COMPARATIVE)

4 g of N-cyclohexylmaleimide were polymerized in accordance with the procedure of Example 1, but replacing sec-butyllithium by $0.85 \times 10^{-3}$ mol of tert-butyllithium. The polymer obtained under these conditions, in a yield of 100%, had a number-average molecular weight of 3,900 and a polydispersity of 1.8.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed:

1. A block copolymer comprising at least one block of an N-substituted maleimide homopolymer having a number average molecular weight ranging from 12,000 to 100,000.

2. A block copolymer comprising at least one block of an N-substituted maleimide homopolymer having a polydispersity index ranging from 1.1 to 1.5.

3. A block copolymer comprising at least one block of an N-substituted maleimide homopolymer having a number-average molecular weight ranging from 12,000 to 100,000 and having a polydispersity index ranging from 1.1 to 1.5.

4. The block copolymer as defined by claim 1, comprising at least one block of an acrylic or methacrylic homopolymer.

5. The block copolymer as defined by claim 2, comprising at least one block of an acrylic or methacrylic homopolymer.

6. The block copolymer as defined by claim 3, comprising at least one block of an acrylic or methacrylic homopolymer.

7. The block copolymer as defined by claim 4, said at least one acrylic or methacrylic block having a number-average molecular weight ranging from 2,000 to 100,000.

8. The block copolymer as defined by claim 5, said at least one acrylic or methacrylic block having a number-average molecular weight ranging from 2,000 to 100,000.

9. The block copolymer as defined by claim 6, said at least one acrylic or methacrylic block having a number-average molecular weight ranging from 2,000 to 100,000.

10. The block copolymer as defined by claim 4, comprising at least one endblock of said N-substituted maleimide homopolymer.

11. The block copolymer as defined by claim 5, comprising at least one endblock of said N-substituted maleimide homopolymer.

12. The block copolymer as defined by claim 6, comprising at least one endblock of said N-substituted maleimide homopolymer.

13. The block copolymer as defined by claim 4, comprising at least one endblock of said acrylic or methacrylic homopolymer.

14. The block copolymer as defined by claim 5, comprising at least one endblock of said acrylic or methacrylic homopolymer.

15. The block copolymer as defined by claim 6, comprising at least one endblock of said acrylic or methacrylic homopolymer.

* * * * *